US006310350B1

(12) United States Patent
Silver et al.

(10) Patent No.: US 6,310,350 B1
(45) Date of Patent: Oct. 30, 2001

(54) MULTIPLEXED MICROCALORIMETER ARRAY

(76) Inventors: Eric H. Silver, 59 Maple St., Needham, MA (US) 02192; Norman W. Madden, 1293 Murdell La., Livermore, CA (US) 94550

( * ) Notice: Subject to any disclaimer, the term of this patent is extended or adjusted under 35 U.S.C. 154(b) by 0 days.

(21) Appl. No.: 09/404,288

(22) Filed: Sep. 23, 1999

Related U.S. Application Data
(60) Provisional application No. 60/101,640, filed on Sep. 24, 1998.

(51) Int. Cl.[7] ................................. G01T 1/36; G01T 1/24
(52) U.S. Cl. ................................. 250/370.06; 250/370.01; 250/370.15
(58) Field of Search ........................ 250/370.06, 370.15, 250/370.01

(56) References Cited

U.S. PATENT DOCUMENTS 5,777,336 * 7/1998 Silver et al. ................. 250/370.15

* cited by examiner

*Primary Examiner*—Constantine Hannaher
(74) *Attorney, Agent, or Firm*—Choate, Hall & Stewart; Sam Pasternack

(57) ABSTRACT

Multi-element microcalorimeter array. The microcalorimeter array includes at least two microcalorimeter with each microcalorimeter including a detector coupled thermally to a cold bath. Each detector has associated with it a thermal sensor to generate a signal proportional to a rise in the detector's temperature. A single negative voltage feedback JFET preamplifier circuit is connected to each of the detectors and includes a JFET with a gate, the signals from the thermal sensors connected to the gate. The output of the preamplifier circuit is proportional to radiation energy absorbed by the detector. Each detector has a different thermal recovery time so that the detectors can be discriminated. The multiplexing arrangement of the invention makes it possible to reduce the overall number of preamplifier and post-processing channels for a large multi-element array. This reduction in turn significantly lowers the JFET heat load, mass and power requirements for the microcalorimeter array.

9 Claims, 2 Drawing Sheets

MULTIPLEXED MICROCALORIMETER ARRAY

A claim of priority is being made to provisional application Ser. No. 60/101,640 filed Sep. 24, 1998.

The United States Government has rights in this invention under grant No. N00014-95-1-1248.

BACKGROUND OF THE INVENTION

1. Field of the Invention

The present invention generally relates to high resolution, broad band x-ray microcalorimeters and specifically to the electronic readout for these x-ray spectrometers.

2. Description of Related Art

When operated below 300 mK, cryogenic microcalorimeters offer nearly 100% efficiency between 100 eV and 10 keV and an energy resolution of a few electron volts. Currently available x-ray detectors cannot match such capabilities simultaneously. As a consequence, microcalorimeters are being used to improve the spectroscopy of astrophysical and laboratory plasmas as well as enhancing the sensitivity of present-day x-ray fluorescence methods for trace element determination in biological specimens, geological and environmental waste samples. This includes microanalysis using electron excitation in scanning electron microscopes, x-ray fluorescence using synchrotron radiation and proton excitation.

In a microcalorimeter, x-ray photons are absorbed and thermalized in a detector which is weakly coupled thermally to a cold bath. The rise in the detector's temperature as a result of the x-ray absorption is measured with a thermal sensor, producing an electrical signal that is proportional to the x-ray energy. For operation at temperatures below 4K these thermal sensors, or thermistors, take advantage of the strong temperature dependence of resistance in doped semiconductor crystals such as silicon or germanium. The electrical resistance of the sensor is determined by hopping conduction of free carriers, a process that is characteristic of doped germanium at cryogenic temperatures. See, U.S. Pat. No. 5,777,336.

The semiconductor thermistor used in such a microcalorimeter is impedance-matched to a JFET negative voltage feedback circuit. See, Silver et al. SPIE, Vol. 1159 at 423 (1989). An energy resolution of 5.9 eV at 1.5 keV and 7 eV at 6 keV has been achieved with neutron transmutation-doped (NTD) germanium-based thermistor technology. The thermalization time of the NTD-based detectors is about 10–20 $\mu$s and the thermal recovery time, $\leq$500 $\mu$s.

Up to now, a microcalorimeter has required a matching JFET preamplifier to operate successfully. There are many space-based and industrial applications that could benefit from operating multi-element arrays of these microcalorimeters. The corresponding number of preamplifiers and data processors could seriously drain available resources if the array consists of 50 or more microcalorimeters and their associated preamplifiers and data processors. Multiplexing a single JFET preamplifier among several microcalorimeters would be extremely advantageous in such cases.

SUMMARY OF THE INVENTION

In one aspect, the multi-element microcalorimeter array includes at least two microcalorimeters with each microcalorimeter including a detector coupled thermally to a cold bath. Each detector has a thermal sensor to generate a signal proportional to a rise in the detector's temperature. A single negative voltage feedback JFET preamplifier circuit is provided. This circuit includes a JFET with a gate, and the signals from thermal sensors are connected to this gate. The output of the preamplifier circuit is proportional to radiation energy absorbed by the detector. Each detector has a different thermal recovery time so that the individual detector channels may be identified easily.

In a preferred embodiment the thermal sensor is a thermistor which may be a neutron transmutation-doped (NTD) germanium-based semiconductor. Each thermistor is impedance-matched to the JFET preamplifier. It is preferred that each detector have fast thermalization times and high signal-to-noise ratios. The thermal recovery times of the detectors may be altered by the construction of the thermal link to the cold bath. It is also preferred that the signal from the thermal sensors be confined to frequencies in which Johnson noise predominates. The invention is particularly adapted for detecting x-ray energy.

It is, therefore, an object of the present invention to provide a method to multiplex one JFET preamplifier among several semiconductor-based microcalorimeters. The negative voltage feedback amplifier circuit offers the possibility to multiplex a single JFET between at least two detectors. Due to the virtual ground established by the negative feedback, more than one thermistor can be connected to the gate of the JFET without introducing cross-talk between the channels. The individual detector channels are identified easily by engineering the thermal recovery time to be slightly different for each detector channel. In general, the connection of multiple channels will increase the noise per channel as seen at the output of the JFET preamplifier. This potential noise increase can be overcome by using detectors with fast thermalization times and high signal-to-noise ratios. The signal of interest can then be confined to frequencies where the Johnson noise dominates and is controllable to a desired level. This multiplexing scheme makes it possible to reduce the overall number of preamplifier and post-processing channels for a large multi-element array. This reduction in turn significantly lowers the JFET heat load, mass and power requirements for the spectrometer array and is especially important for space-based applications where mass and power are at a premium. Where mass and power are not limited, the multiplexing scheme of the invention offers the opportunity to add more pixels to the array at no cost to the electronics and without jeopardizing the heat load and lifetime of the cryogen which forms the cold bath.

DETAILED DESCRIPTION OF THE INVENTION

Figure 1:
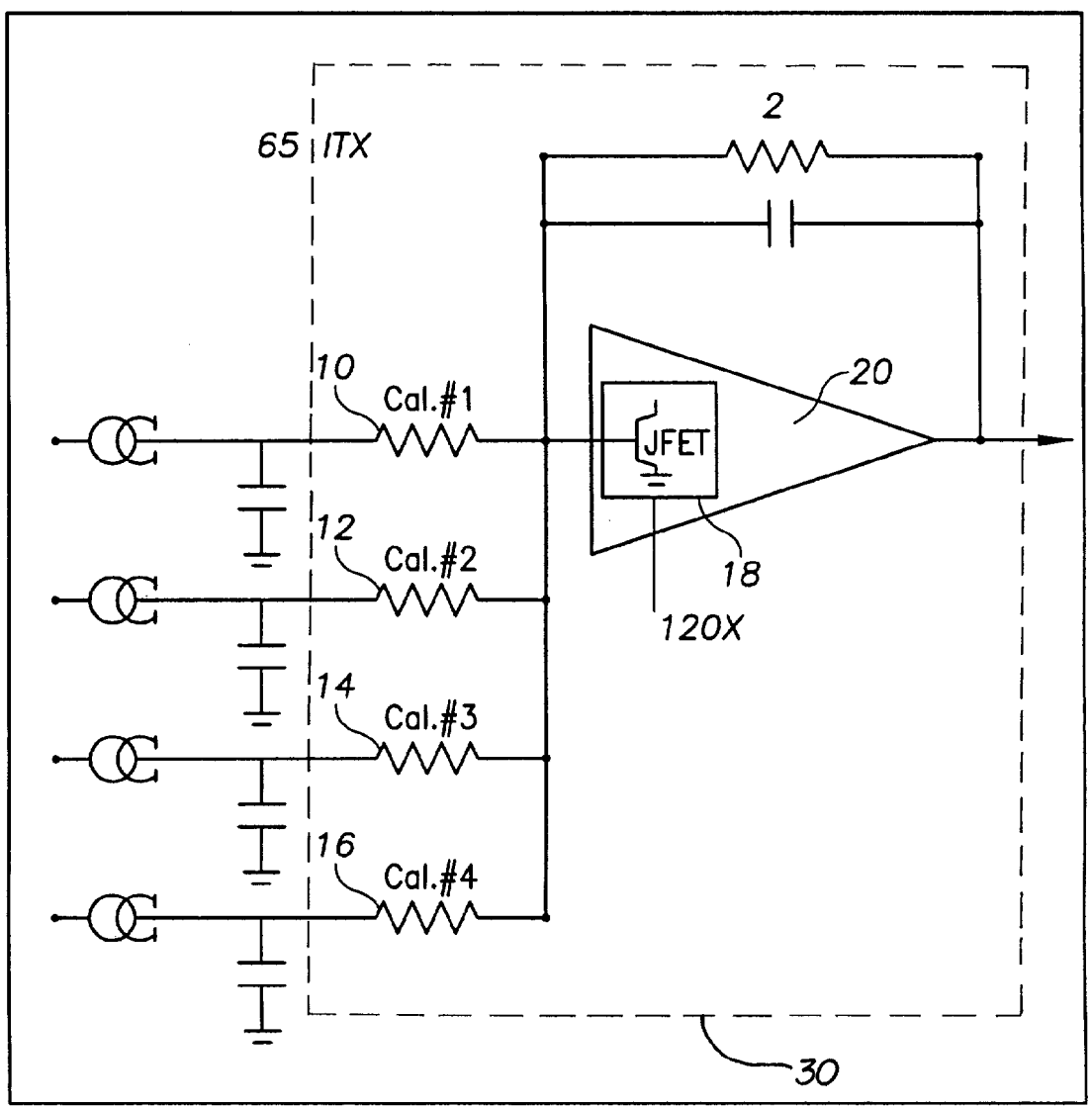
FIG. 1 is a schematic circuit diagram of the multiplexing system of the invention.
Figure 2:
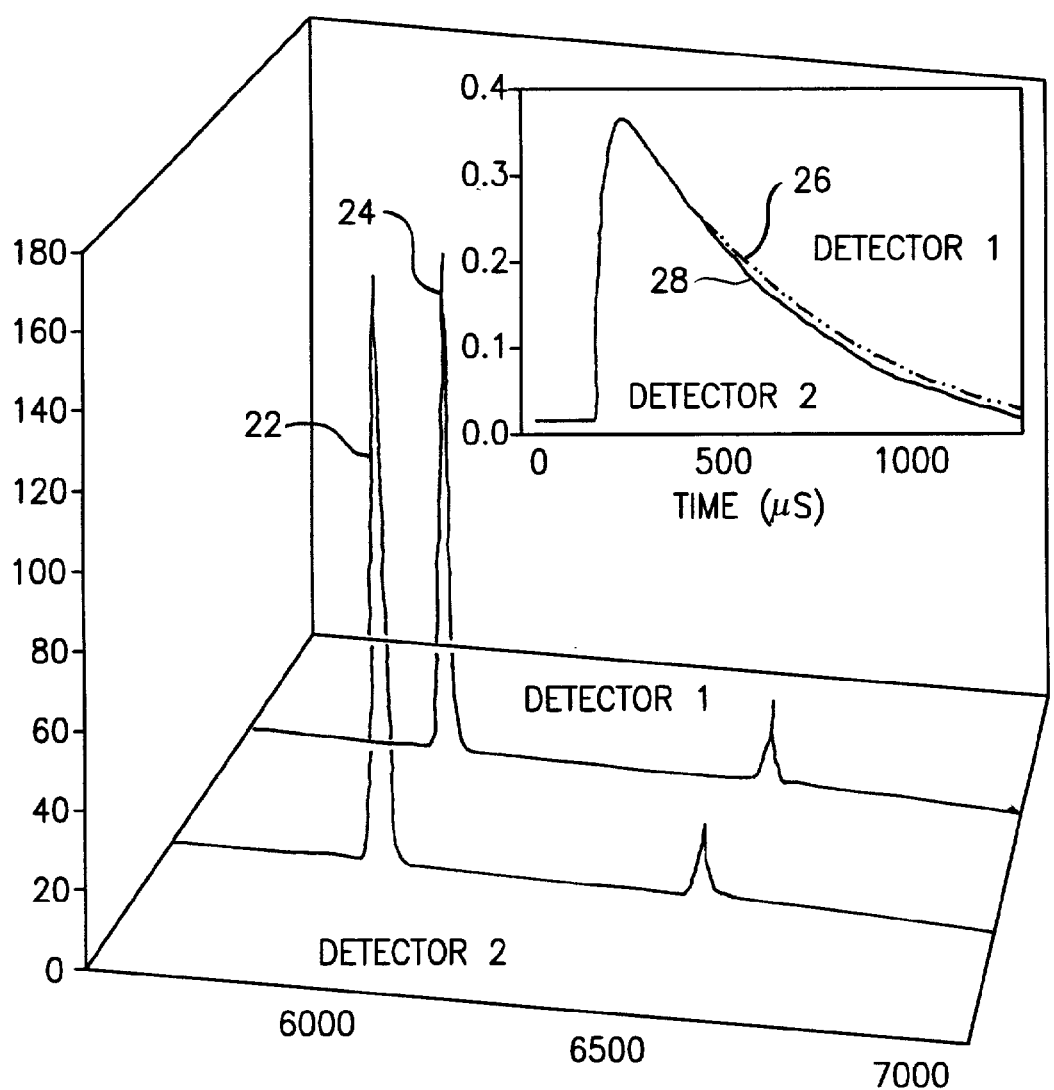
FIG. 2 is a graph showing pulses from two multiplexed microcalorimeters along with an illustration of the difference in thermal recovery time for two detectors.

Referring to FIG. 1, four semiconductor-based microcalorimeters 10, 12, 14 and 16 are connected to a single JFET 18 negative voltage feedback preamplifier 20. Experiments have demonstrated that at least two microcalorimeters can be connected to one JFET without degrading the energy resolution below 7 eV at 6 keV. This result is shown in FIG. 2. The pulses 22 and 24 from the two detectors 10 and 12 are distinguished by the difference in their thermal recovery times 26, 28 which are controlled in the fabrication of the thermal link to the cold bath 30 with which the detectors are thermally associated. The total noise contribution from both detectors combined was 5 eV while the actual energy resolution was 7 eV for each detector. The upper limit to the noise contribution from each detector was 3.5 eV assuming an equal share of the noise. The noise is actually somewhat less per detector channel because there is only one JFET 18 in the circuit. Multiplexing two more detectors 14 and 16, as shown in FIG. 1 is therefore possible without degrading the energy resolution below 7 eV. The detector may be a superconducting tunnel junction that is AC-coupled to the JFET 18.

It is recognized that modifications and variations of the invention disclosed herein will be apparent to those skilled in the art and it is intended that all such modifications and variations be included within the scope of the appended claims.

What is claimed is:

1. Multi-element microcalorimeter array comprising:
    at least two microcalorimeters, each microcalorimeter including a detector coupled thermally to a cold bath, each said detector having a thermal sensor to generate a signal proportional to a rise in the detector's temperature; and
    a single negative voltage feedback JFET preamplifier circuit including a JFET with a gate, the signals from the thermal sensors connected to the gate, the output of the preamplifier circuit being proportional to radiation energy absorbed by the detector, wherein each detector has a different thermal recovery time, the differences in the thermal recovery times being established by construction of thermal coupling to the cold bath.

2. The multi-element microcalorimeter array of claim 1 wherein the thermal sensor is a thermistor.

3. The microcalorimeter array of claim 2 wherein each thermistor is impedance-matched to the JFET preamplifier.

4. The microcalorimeter array of claim 2 wherein the thermistor is a neutron transmutation-doped (NTD) germanium-based semiconductor.

5. The microcalorimeter array of claim 2 wherein the thermistor is ion-implanted silicon.

6. The microcalorimeter array of claim 1 wherein each detector has fast thermalization times and high signal-to-noise ratios.

7. The microcalorimeter array of claim 1 wherein the signal is confined to frequencies in which Johnson noise predominates.

8. The microcalorimeter array of claim 1 wherein the radiation energy is x-ray energy.

9. The microcalorimeter array of claim 1 wherein the detector is a semiconductor-based calorimeter.

* * * * *